United States Patent Office 3,534,020
Patented Oct. 13, 1970

3,534,020
ISOXAZOLE PENICILLINS
John Michael Essery, Fayetteville, and Donald Richard Van Harken, Syracuse, N.Y., assignors to Bristol-Myers Company, New York, N.Y., a corporation of Delaware
No Drawing. Filed Mar. 17, 1969, Ser. No. 807,932
Int. Cl. G07d 99/16
U.S. Cl. 260—239.1      8 Claims

ABSTRACT OF THE DISCLOSURE

The specification discloses 5-hydroxymethyl derivatives of 3-substituted isoxazole penicillins including oxacillin, cloxacillin, and dichloxacillin and a method for preparing these compounds which are useful as antibiotic agents.

BACKGROUND OF THE INVENTION

This invention relates to new synthetic compounds having utility as antibacterial agents, as nutritional supplements in animal feeds, as therapeutic agents for the treatment of mastitis in cattle, and as therapeutic agents for the treatment of infectious diseases in poultry and animals, including man.

There is a need to provide alternative and improved antibacterial agents for the treatment of bacterial infections in living hosts and for the decontamination of objects and surfaces exposed to such organisms.

Such antibiotic compounds and methods for their preparation are shown in the U.S. Pats. 2,996,501 and 3,239,507 which disclose a certain class of synthetic penicillins generally described as isoxazole penicillins.

The use of such penicillins in the treatment of infections of a bacterial nature has been studied in some detail. See Knudsen et al., Lancet ii, 632, 1962; Rolinson et al., Antimicrobial Agents and Chemotherapy, 1962, 654; Naylor et al., Nature (London), 195, 1264, 1962; and Hanson et al., J. Chem. Soc., 5976–5983, 1965. These publications reveal the results of various studies relating to the recovery of certain isoxazole penicillins and metabolic modifications thereof from human and animal blood and urine.

DESCRIPTION OF THE INVENTION

Broadly, this invention is directed to new derivatives of isoxazole penicillins characterized by the formula

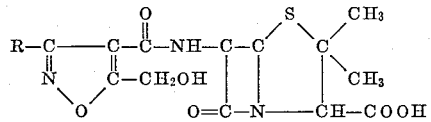

wherein R is a member of the group consisting of lower alkyl; lower alkylthio; cyclohexyl; cyclopentyl; cycloheptyl; aralkyl including benzyl, phenethyl, styryl, phenylpropyl, and the like; aryl such as halophenyl, particularly chloro- and bromophenyl, lower alkylphenyl, lower alkoxyphenyl; thienyl; substituted thienyl such as mono and poly chloro thienyl, and aralkylthio. Also included within the invention are the nontoxic pharmaceutically acceptable salts of the above-described acids. The above-described acids and their salts are generally referred to as penicillins.

A prefererd group of compounds within the scope of the invention is that class of compounds wherein R is selected from the group consisting of phenyl, halophenyl, dihalophenyl, particularly o-chlorophenyl and 2,6-dichlorophenyl, thienyl, 2,5-dichlorothienyl, 3,5-dichlorothienyl, and 5-chlorothienyl.

The term "lower" as used herein, including the appended claims, refers to straight and branched chain aliphatic hydrocarbon radicals having from 1 to about 10 carbon atoms and preferably from 1 to about 5 carbon atoms, and the term "aryl" refers to the phenyl radical and to substituted phenyl in which the phenyl group can bear from 1 to 3 members selected from the group consisting of fluoro, chloro, bromo, iodo, trifluoromethyl, lower alkyl, lower alkoxy, nitro, methylsulfonyl, cyano, di(lower)-alkylamino, methyl mercapto and the like.

Another aspect of this invention is the achievement of the objective of providing a method of inhibiting the growth of bacteria, particularly pencillinase-producing bacteria, which comprises applying to the habitat or bacterial environment an antibacterially effective amount of at least one of the compounds of this invention. Accordingly, an important embodiment of the invention is medicinal or therapeutic compositions which comprise an effective amount of at least one of the antibacterial compounds, herein disclosed, in combination with one or more physiologically acceptable carriers, excipients, flavoring agents, preservatives or the like. For convenience, these and other similar additives can be described as adjuvants and this term will be understood to include all ingredients other than the antibiotic or active ingredient of an antibiotic composition. Preferred compositions of this type will contain, in addition to suitable adjuvants, an effective amount of a penicillin selected from the group consisting of 6 - [3 - phenyl - 5 - hydroxymethylisoxazole - 4 - carboxamido)penicillanic acid, 6-[3-o-chlorophenyl - 5 - hydroxymethylisoxazole - 4 - carboxamido]penicillanic acid, 6-[3-(2,6-dichlorophenyl) - 5 - hydroxymethylisoxazole-4-carboxamido]penicillanic acid, and the nontoxic pharmaceutically acceptable salts thereof.

Another important aspect of the invention relates to the provision of a process for preparing the antibiotic compounds of this invention. Accordingly, there is disclosed a method for synthesizing the compounds of the invention.

As used herein, including the appended claims, the term "effective amount" means an amount of the antibiotic compound which is sufficient to at least inhibit the growth of a bacterial organism in the habitat, be it in vitro or in vivo, being treated.

Suitable salts of the above penicillins which are within the contemplation of this invention include the nontoxic metallic salts such as the sodium, calcium, potassium, and aluminum salts; ammonium salts and substituted ammonium salts, e.g., salts of nontoxic amines such as trialkylamines including triethylamine, procaine, dibenzylethylenediamine, dehydroabietylamine, N,N'-bis-dehydroabietylethylenediamine; N-lower-alkyl piperidines, e.g., N-ethylpiperidine; and other amines which have been used to form salts of penicillins. Such salts and the methods by which they are prepared are well known in the art.

In the treatment of bacterial infections in animals such as man, the compounds of this invention are administered both orally and parenterally, in accordance with conventional procedures for antibiotic administration, in an amount of from about 5 to 60 mg./kg./day and preferably about 15 mg./kg./day in divided dosages, e.g., three or four times a day. They are administered in dosage units containing, for example, 62.5, 125 or 250 or 500 mg. of active ingredient in combination with suitable physiologically acceptable adjuvants. The dosage units can be in the form of liquid preparations such as solutions, suspensions, dispersions, or emulsions or in solid forms such as tablets, capsules, troches, and the like. Suitable carriers of both liquid and solid nature are well known in the pharmaceutical art. The carrier may be water containing gelatin, acacia, algenate, dextran, sodium carboxymethyl cellulose, polyvinyl pyrrolidone or the like.

Penicillanic acid derivatives of the invention can be prepared by coupling 6-aminopenicillanic acid, preferably in the form of a neutral salt such as the sodium or triethylamine salt or an easily hydrolyzable ester such as the phenacyl or p-bromophenacyl ester, with a suitable acylating agent for the primary amino group, e.g., a compound of the formula

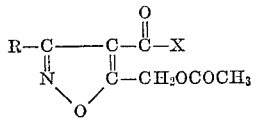

wherein R is as defined above and X is hydroxy or chloro, or the functional equivalent of such a compound. Such carboxylic acids, acid chlorides, and their functional equivalents are valuable intermediates which are useful in the preparation of the penicillins herein disclosed.

Compounds which are functionally equivalent to the free acetoxymethylisoxazole carboxylic acid for the purpose of acylating the primary amino group of the 6-aminopenicillanic acid include the corresponding carboxylic acid chlorides, bromides, acid anhydrides, including mixed anhydrides, particularly the mixed anhydrides prepared from stronger acids such as the lower aliphatic monoesters of carbonic acid of alkyl and aryl sulfonic acids and of more hindered acids such as diphenylacetic acid. In addition, an acid azide or an active ester or thioester (e.g., with p-nitrophenol, thiophenol, thioacetic acid) may be used or the free acid itself may be coupled with 6-aminopenicillanic acid by the use of enzymes or of a carbodiimide reagent [cf. Sheehan and Hess, J. Amer. Chem. Soc., 77, 1067, (1955)], or of alkynylamine reagent [cf. R. Buijle and H. G. Viehe, Angew. Chem. International Edition, 3, 582 (1964)], or of a ketenimine reagent [cf. C. L. Stevens and M. E. Monk, J. Am. Chem. Soc., 80, 4065 (1958)] or of an isoxazolium salt reagent [cf. R. B. Woodward, R. A. Olofson and H. Mayer, J. Am. Chem. Soc., 83, 1010 (1961)]. Another equivalent of the acid chloride is a corresponding azolide, i.e., an amide of the corresponding acid the amide nitrogen of which is a member of a quasi-aromatic five-membered ring containing at least two nitrogen atoms, e.g., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential.

The procedures and conditions for carrying out the acylation reaction are those which are generally applicable to the production of penicillins such as benzylpenicillin and phenoxymethylpenicillin. These procedures are well known and are disclosed in U.S. Pat. 3,278,524.

The easily hydrolyzable esters of 6-aminopenicillanic acid to be used in this process are those which by simple test are stable enough to avoid self-condensation but at the same time are labile enough to allow the carboxyl-protection function, i.e., the ester group, to be removed, when desired to regenerate the carboxyl group without destroying the sensitive β-lactam ring, photochemically or by treatment with sodium thiophenoxide in an inert solvent according to Sheehan et al., J. Org. Chem., 29, 2006, (1964). This removal of the ester group is to be practiced on these esters after they have been acylated (to produce a penicillin).

More specifically, use is made of esters of 6-aminopenicillanic acid of the formula

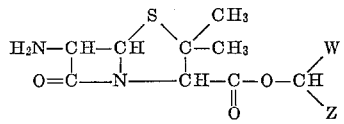

wherein, when W represents hydrogen, Z represents (a) Alkanoyl, e.g., acetyl, propionyl, n-butyryl, n-decanoyl;

(b) Aroyl, e.g., benzoyl, 1-naphthoyl, 2-furoyl, 2-thenoyl;

(c) Substituted aroyl and especially mono-substituted benzoyl, e.g., p-nitrobenzoyl, p-aminobenzoyl, p-methylbenzoyl, halobenzoyls, 3,4-dihydroxybenzoyl, p-phenylbenzoyl, p-methanesulfonylbenzoyl;

(d) N-phthalimido, N-succinimido, N-saccharino, which has the formula

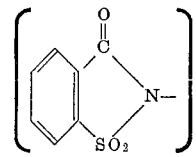

N,N-dialkylcarbamoyl, e.g., N,N-diethylcarbamoyl, N-alkylcarbamoyl;

(e) Cyano;

(f) Alkoxy, e.g., methoxy; alkylthio, e.g., methylmercapto; aryloxy, e.g., phenoxy;

(g) Carbalkoxy, e.g., carbethoxy (from the ethyl bromo-acetate);

(h) Carbobenzoxy, e.g., from benzyl chloroacetate;

(i) Carbamoyl, e.g., from α-chloroacetamide;

(j) Benzoyloxy, e.g., from bromomethyl benzoate, chlorobenzoyloxy;

(k) Carbophenoxy, e.g., from phenyl chloroacetate:

(l) Carbo-tert.-butoxy, e.g., from tert.-butyl bromoacetate;

(m) alkylsulfonyl, e.g., from chloromethyl sulfone; and, when W represents carbalkoxy, Z represents carbalkoxy, e.g., from diethyl bromomalonate; and, when W represents phenyl, Z represents benzoyl (giving desyl) or cyano; and, when W represents (lower)alkyl, Z represents (lower)alkanoyl, e.g., from 3-bromo-2-butanone; or wherein W and Z taken together represent 2-oxocycloalkyl containing 4 to 8 carbon atoms inclusive, e.g., from 2-chlorocyclohexanone; and acid addition salts thereof.

The preferred activated esters of 6-aminopenicillanic acid are those of the formula

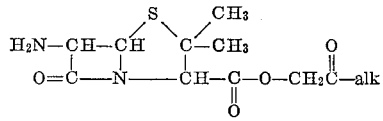

wherein alk represents (lower)alkyl, and especially methyl, and the acid addition salts thereof and those of the formula

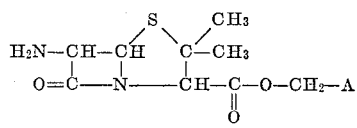

wherein A represents benzoyl, naphthoyl, furoyl, thenoyl, nitrobenzoyl, halobenzoyl, methylbenzoyl, methanesulfonylbenzoyl or phenylbenzoyl and acid addition salts thereof.

The penicillin esters thus obtained are then cleaved by reaction with sodium thiophenoxide to provide sodium salts of the corresponding penicillins. To each mole of the former there is added about one or two moles of sodium thiophenoxide dissolved in a dry inert solvent such as dimethylformamide or dimethyl sulfoxide. The mixture is stirred at room temperature until the reaction is completed (which often requires less than one hour) and the penicillin is recovered in the conventional manner, e.g., by solvent extraction based on the acidic nature of the carboxyl group or by direct precipitation upon addition of acetone, ethyl acetate or the like. Temperatures as low as 5° C. are useful but require longer reaction times and often give lower yields than are obtained at 20° to 35° C., or, preferably at about 25° C.

Penicillin esters can also be converted to the corresponding penicillins by cautious treatment with other bases such as sodium hydroxide or sodium acetate or by exposure to ultra-violet light.

The sodium 6[5 - acetoxymethylisoxazole - 4 - carboxamido]penicillanate can be converted conveniently to the corresponding 5-hydroxymethylisoxazole by hydrolysis of the acetoxy group, e.g., by enzymatic hydrolysis, with an esterase.

At the conclusion of the reaction, the products can be isolated by the techniques used with benzylpenicillin and phenoxymethylpenicillin. Thus, the product can be extracted into diethyl ethehr or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethtylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A convenient method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms, precipitates, usually in crystalline form, and is collected by filtration or decantation.

The preparation of suitable 5-acetoxymethylisoxazole acids for acylation of 6-aminopenicillanic acid can be illustrated by the following reaction scheme

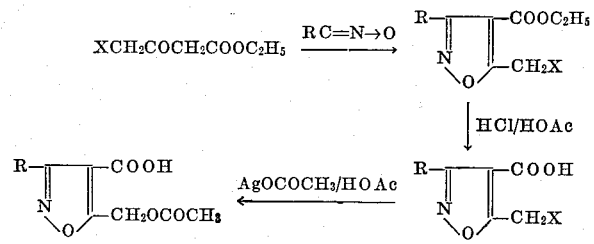

In the above formulae, X is preferably chloro or bromo, and R is some suitable substituent group, hereinbefore disclosed, depending on the ultimate penicillin compound desired and the compatibility of the desired substituent with the reaction conditions.

The above reaction outline provides a convenient method for preparing a variety of 3-aryl-5-chloromethylisoxazole-4-carboxylic acids for use in making the antibiotic compounds of the invention. Similarly, the preparation of 3-alkyl-5-chloromethylisoxazole-4-carboxylic acids can be illustrated by U.S. Pat. 2,996,501, particularly Example 16, in which chloroacetyl chloride can be substituted for acetyl chloride. Alternatively, 3-alkyl-5-methylisoxazole-4-carboxylic acids and 3-aryl-5-methylisoxazole-4-carboxylic acids can be halogenated, e.g., with N-bromosuccinimide, followed by isolation and recovery of the various halogen-containing fractions.

The following examples illustrate the preparation of compounds within the contemplation of the present invention. All temperatures are given in degrees centigrade.

EXAMPLE 1

Ethyl 3(2,6 - dichlorophenyl)-5-chloromethylisoxazole-4-carboxylate.—To a cold (5° to 10°) slurry of 18.9 grams (0.1 mole) of 2,6-dichlorobenzaldoxime in 100 ml. of water there was added, with vigorous stirring, 212 ml. (approximately 0.15 mole) of sodium hypochlorite solution at a rate such as to keep the temperature of the mixture below about 10°. After the addition had been completed, the resulting mixture was stirred 0.5 hour and the nitrile oxide which formed was collected by filtration, washed with water and air-dried for two hours. The solid was slurried in 100 ml. of 100% ethanol at 5° and was treated successively with 17.1 grams (0.104 mole) of ethyl 4-chloroacetoacetate [Hamel, Bull. Soc. Chim., 29, 390, (1921)] and a solution of 0.88 gram of sodium hydroxide in 40 ml. of 100% ethanol. An exothermic reaction occurred and a clear yellow solution resulted. This was stirred for 15 minutes. The solvent was then removed under reduced pressure. The semi-solid residue was stirred briefly with 100 ml. of water and 100 ml. of ether, and the ether layer was separated. The aqueous phase was extracted with two 60 ml. portions of fresh ether, and all of the ether phases were combined, washed with water and dried over anhydrous magnesium sulfate. Evaporation of the solvent provided a solid which was recrystallized from a mixture of ethyl acetate and petroleum ether, identified below. The product was recrystallized twice from a petroleum ether fraction consisting essentially of n-hexane and having a boiling point of 60° to 68° to give 20.0 grams, 59%, of colorless needles, M.P. 74° to 76°, having the following analysis:

Found (percent): C, 47.22; H, 3.46. Calculated for $C_{13}H_{10}Cl_3NO_3$ (percent): C, 46.66; H, 3.01.

EXAMPLE 2

3(2,6 - dichlorophenyl) - 5 - chloromethylisoxazole-4-carboxylic acid.—A mixture of 5.0 grams of ethyl 3(2,6-dichlorophenyl) - 5 - chloromethylisoxazole-4-carboxylate, 25 ml. of concentrated hydrochloric acid and 30 ml. of glacial acetic acid was heated for 20 hours on the steam-bath. The solution was cooled and added to 120 ml. of ice-water. The resulting mixture was extracted into three 50 ml. portions of methylene chloride. The extracts were combined, washed with water, dried over magnesium sulfate, and evaporated to a small volume in the presence of toluene to remove any acetic acid. A crystalline solid separated and was collected by filtration. The collected solid was recrystallized from toluene to give 3.6 grams, 79%, of carboxylic acid.—A mixture of 306 mg. (1 mmole) of Found (percent): C, 43.70; H, 2.13. Calculated analysis for $C_{11}H_6Cl_3NO_3$ (percent): C, 43.10; H, 1.97.

EXAMPLE 3

3(2,6 - dichlorophenyl) - 5 - acetoxymethylisoxazole-4-carboxylic acid.—A mixture of 306 mg. (1 mmole) of 3(2,6 - dichlorophenyl) - 5 - chloromethylisoxazole-4-carboxylic acid, 167 mg. (1 mmole) of silver acetate and 6 ml. of glacial acetic acid was heated under reflux with stirring for 21 hours. The mixture was cooled and filtered through infusorial earth. The filtrate was evaporated to dryness. The residue was triturated with petroleum ether, as described above, to give an amorphous solid which was crystallized from hot toluene to give tan needles of M.P. 170° to 172°.

EXAMPLE 4

3 - phenyl-5-chloromethylisoxazole-4-carboxylic acid.—To a cold (−10°) solution of 12.1 grams (0.1 mole) of benzaldoxime in 70 ml. of chloroform there was added, dropwise with stirring, a solution of 7.79 grams (0.11 mole) of chlorine in 50 ml. of chloroform. The resulting mixture was allowed to come to room temperature over a 16-hour period. Removal of the solvent under reduced pressure gave a yellow oil which was dissolved in 70 ml. of 100% ethanol. This solution was cooled to 0° and treated dropwise with a solution of 18.6 grams (0.1 mole) of the sodium salt of ethyl 4-chloroacetoacetate in ethanol [prepared from 16.4 grams (0.1 mole) of ethyl 4-chloroacetoacetate and 2.3 grams (0.1 mole) of sodium in 70 ml. of 100% ethanol]. The resulting reaction mixture was allowed to come to room temperature over a two-hour period and the solvent was then removed under reduced pressure. The residual oil was dissolved in a mixture of 40 ml. of water and 40 ml. of ether with stirring. The ether layer was separated and the aqueous phase was extracted with two 40 ml. portions of fresh ether. The ether phases were combined, washed successively with 40 ml. of 5% sodium hydroxide solution and 40 ml. of water, and then dried over magnesium sulfate. Removal of the solvent under reduced pressure gave a yellow oil (18 grams).

Five grams of the resulting crude ester was heated under reflux with stirring for 18 hours with a mixture of 35 ml. of glacial acetic acid and 30 ml. of concentrated hydrochloric acid. The resulting solution was cooled and added to 100 ml. of ice-water. The brown solid which precipitated was collected by filtration, washed with water and air-dried. Recrystallization from toluene gave 0.96 gram of tan needles, M.P. 142° to 143°.

EXAMPLE 5

3-phenyl-5-acetoxymethylisoxazole-4-carboxylic acid.—A mixture of 16.5 grams (0.07 mole) of 3-phenyl-5-chloromethylisoxazole-4-carboxylic acid, 11.69 grams (0.07 mole) of silver acetate and 420 ml. of glacial acetic acid was heated under reflux with stirring for 72 hours. The mixture was cooled and filtered through infusorial earth. The filtrate was evaporated to dryness under reduced pressure, toluene being added to azeotrope the last traces of acetic acid. Recrystallization of the solid residue from toluene gave 6.0 grams of a product, M.P. 138° to 139°.

Found (percent): C, 59.42; H, 4.75. Analysis calculated for $C_{13}H_{11}NO_5$ (percent): C, 59.76; H, 4.24.

EXAMPLE 6

Sodium 6[3-phenyl-5-acetoxymethylisoxazole-4-carboxamido] - penicillanate.—A mixture of 2.7 grams (10.7 mmole) of 3 - phenyl-5-acetoxymethylisoxazole-4-carboxylic acid and 35 ml. of thionyl chloride was heated under reflux for one hour. The excess reagent was then removed, under reduced pressure, the last traces being removed by azeotropic distillation with benzene.

A solution of 2.32 grams (10.7 mmole) of 6-aminopenicillanic acid in 100 ml. of water at pH 7.0 was layered with 50 ml. of ethyl acetate, and the pH was lowered to 2.8 with 6 N sulfuric acid. A solution of the crude acid chloride in 30 ml. of ethyl acetate was added in one portion with vigorous stirring. The pH was maintained in the range of 2.8 to 3.0 for one hour while the reaction mixture was vigorously stirred. The temperature of the mixture was then reduced to 15°, the pH adjusted to 2.0, and stirring continued for eight minutes. After filtration through infusorial earth, the layers were separated and the aqueous phase was extracted with 50 ml. of fresh ethyl acetate. The organic phases were combined, washed with water, and dried over anhydrous magnesium sulfate. The solution was treated with 1.6 grams (10 mmoles) of sodium 2-ethylhexanoate (NaEH) dissolved in 50 ml. of ethyl acetate. After removal of the solvent under reduced pressure, there remained an oily residue which was triturated with dry ether to give the sodium salt of the penicillin as a white solid which was dried over $P_2O_5$ in vacuo. The yield was 3.7 grams, 77%. Infrared and NMR spectral data were consistent with the structure.

Found (percent): C, 49.87; H, 4.95; $H_2O$, 4.70. Analysis calculated for $C_{21}H_{20}N_3O_7SNa \cdot 1½ H_2O$ (percent): C, 49.59; H, 4.55; $H_2O$, 5.31.

EXAMPLE 7

Sodium 6[3-phenyl - 5-hydroxymethylisoxazole-4-carboxamido]penicillanate.—A solution of 500 mg. (1.04 mmole) of sodium 6[3-phenyl-5-acetoxymethylisoxazole-4-carboxamido]penicillanate in 300 ml. of 0.1 N phosphate buffer at pH 7.5 was stirred for two hours at 37° in the presence of 2.5 grams *B. subtilis* ATCC 6633. The solution was diluted with 350 ml. of acetone and the protein which precipitated was removed by filtration through infusorial earth. The acetone was removed from the filtrate under reduced pressure, and the residual aqueous solution was layered with 75 ml. of ether, cooled to 10° and acidified, with stirring, to pH 2.6 with 40% phosphoric acid. After separation of the layers, the aqueous phase was extracted with 75 ml. of fresh ether. The ether phases were combined, washed with cold water, dried over magnesium sulfate, and treated with a solution of 172 mg. (1.04 mmole) of sodium 2-ethylhexanoate (NaEH) in 20 ml. of dry ether. The resulting cloudy solution was evaporated to dryness and the residue was triturated with fresh dry ether to give 280 mg. (64%) of product whose infrared and NMR spectra were consistent with the structure.

EXAMPLE 8

Sodium 6[3(2,6 - dichlorophenyl)-5-hydroxymethylisoxazole-4 - carboxamido]penicillanate.—A solution of 500 mg. (0.88 mmole) of sodium 6[3(2,6-dichlorophenyl) - 5-acetoxymethylisoxazole - 4 - carboxamido] penicillanate in 250 ml. of 0.1 N phosphate buffer at pH 7.5 was stirred for one hour at 37° in the presence of 2.5 grams of acetone powder of a *B. subtilis* esterase preparation (ATCC 6633). The solution was diluted with 350 ml. of acetone and the protein material which precipitated was removed by filtration through infusorial earth. After the acetone had been removed under reduced pressure, the aqueous solution was layered with 75 ml. of ether, cooled to 10° and acidified with stirring to pH 2.6 with 40% phosphoric acid. The layers were separated, and the aqueous phase was extracted with 75 ml. of fresh ether and then with 75 ml. of ethyl acetate. All the organic phases were combined, washed with cold water, and dried over magnesium sulfate. A solution of 146 mg. (0.88 mmole) of sodium 2-ethylhexanoate (NaEH) in 20 ml. of dry ether was added. Evaporation of the cloudy solution to dryness and trituration of the residue with dry ether gave 370 mg. (80%) of the penicillin. Infrared and NMR spectra were fully consistent with the structure.

EXAMPLE 9

Replacement, in the procedure of Example 6, of 3-phenyl-5-acetoxymethylisoxazole - 4 - carboxylic acid with an equivalent amount of:

3-(3′,5′-dichloro-2′-thienyl)-5-acetoxymethylisoxazole-4-carboxylic acid;
3-(4′,5′-chloro-2′-thiophene)-5-acetoxymethylisoxazole-4-carboxylic acid;
3-(3′,4′-dichloro-2′-thienyl)-5-acetoxymethylisoxazole-4-carboxylic acid;
3-(5′-chloro-2-thienyl)-5-acetoxymethylisoxazole-4-carboxylic acid;
3-(o-chlorophenyl)-5-acetoxymethylisoxazole-4-carboxylic acid;

followed by the deacetylation procedure of Example 8, gives the corresponding sodium 3-substituted-5-hydroxymethylisoxazole-4-carboxamido penicillanate.

EXAMPLE 10

Ethyl 3(2,6 - dichlorophenyl) - 5 - dibromomethylisoxazole - 4 - carboxylate and ethyl 3(2,6 - dichlorophenyl) - 5 - bromomethylisoxazole-4-carboxylate.—A stirred solution of 30.0 grams (0.1 mole) of ethyl 3(2,6-dichlorophenyl) - 5 - methylisoxazole - 4 - carboxylate and 39.16 grams (0.22 mole) of N-bromosuccinimide in 200 ml. of dry carbon tetrachloride was heated under reflux for eight hours while being illuminated with a "Photoflood" lamp. Benzoyl peroxide (200 mg.) was added and heating and illumination was continued for a further seven hours. The solution was cooled, filtered, and the solvent removed under reduced pressure. The oily residue was chromatographed on silica gel using benzene as the solvent. The first fraction from the column was a yellow oil which crystallized on standing. Recrystallization from a toluene-hexane mixture gave 4.5 grams of colorless prisms having a M.P. of 105.5° to 106.5°. NMR spectrum showed this to be the 5-dibromomethyl compound.

Found (percent): C, 34.20; H, 2.03. Analysis calculated for $C_{13}H_9Br_2Cl_2NO_3$ (percent). C, 34.11; H, 1.98.

The subsequent fractions from the column were combined and rechromatographed on silica gel using a 1:1 mixture of benzene-hexane as the solvent. The first fraction gave 4.1 grams of the 5-dibromomethyl compound. The second and third fractions gave the 5-bromomethyl compound, 4.03 grams, which after recrystallization from hexane had M.P. 83° to 84°.

Found (percent): C, 41.55; H, 2.91. Analysis calculated for $C_{13}H_{10}BrCl_2NO_3$ (percent): C, 41.18; H, 2.65.

The median curative dose ($CD_{50}$), in milligrams per kilogram of body weight, against a leathal infection of a penicillin G resistant Staph. aureus was determined for sodium 6[3 - phenyl-5-hydroxymethylisoxazole-4-carboxamido]penicillanate and the 3[2,6 - dichlorophenyl] analog. In these tests, the antibiotic was administered to mice by intramuscular injection at various dosages at the time of infection and again 4 hours later. Deaths are counted 72 hours after the first dosing. The dosage required at each treatment time to protect 50% of the infected mice was then calculated. The $CD_{50}$ is reported in the form (milligrams/treatment×number of treatments). Comparative tests with dicloxacillin and oxacillin were run under the same conditions. Both oxacillin and dicloxacillin showed a $CD_{50}$ of (7×2) as compared with (18×2) and (35×2), respectively, for the compounds named above.

Minimum inhibitory concentrations (MIC) in micrograms per milliliter were determined by serial two-fold dilution in nutrient broth. Results for the 3-phenyl and the 3[2,6 - dichlorophenyl] - 5-hydroxymethyl penicillin compounds in comparison with oxacillin and dicloxacillin are given in the table below.

| Organism | 3-phenyl | Oxacillin | Dichlorophenyl | Dicloxacillin |
|---|---|---|---|---|
| D. pneumoniae plus 5% serum | .04 | .04 | .04 | .04 |
| Str. pyrogenes | .04 | .04 | .04 | .04 |
| S. aureus Smith | .16 | .08 | .08 | .04 |
| S. aureus Smith plus 50% serum | 2.5 | 2.5 | 2.5 | 2.5 |
| S. aureus 1633-2 | .3 | .16 | .08 | .08 |
| Pr. morganii | >500 | 500 | | |
| E. coli Juhl A15119 | >500 | 500 | 500 | 500 |
| Sal. enteritidis | 125 | 63 | 250 | 250 |
| K. pneumoniae A9977 | 500 | 250 | 250 | 125 |
| K. pneumoniae A15130 | >500 | >500 | 500 | >500 |
| Ps. aeruginosa | >500 | >500 | 250 | 250 |
| Pr. mirabilis A9900 | 500 | 500 | | |

Serum binding tests indicate that both 3-phenyl- and 3[2,6 - dichlorophenyl]hydroxymethylisoxazole penicillin compounds are less serum bound than the corresponding methylisoxazole compound, i.e., oxacillin and dicloxacillin, as shown in the table below:

| Compound: | Percent serum bound |
|---|---|
| 3-phenyl- | 68 |
| Oxacillin | 82 |
| 3[2,6-dichlorophenyl]- | 82, 79 |
| Dicloxacillin | 89, 88 |

We claim:
1. The compounds of formula

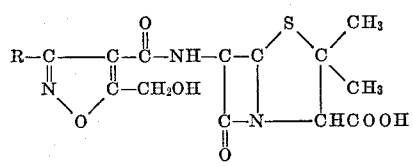

wherein R is a member of the group consisting of lower alkyl; lower alkylthio; cyclohexyl; cyclopentyl; cycloheptyl; chloro-substituted thienyl; aryl; arylalkyl; and arylalkylthio groups, wherein the aryl moiety is styryl phenyl, and substituted phenyl bearing from 1 to 3 members of the group consisting of halo, trifluoromethyl, lower alkyl, lower alkoxy, nitro, methylsulfonyl, cyano, di(lower)alkylamino, and methylmercapto.

2. The compounds of claim 1 wherein R is selected from the group consisting of phenyl and chlorosubstituted phenyl, thienyl, and chlorosubstituted thienyl.

3. The compound of claim 2 wherein R is o-chlorophenyl.

4. The compound of claim 1 wherein R is 2,6-dichlorophenyl.

5. Compounds of the formula

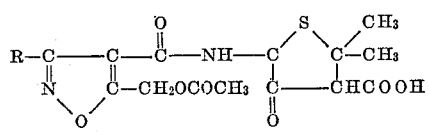

wherein R is as defined in claim 1.

6. The compound of claim 5, wherein R is phenyl, chlorosubstituted phenyl, thienyl, or chlorosubstituted thienyl.

7. The compound of claim 5, wherein R is o-chlorophenyl.

8. The compound of claim 5, wherein R is 2,6-dichlorophenyl.

References Cited

UNITED STATES PATENTS 3,239,507  3/1966  Mayler _____ 260—239.1
3,290,291  12/1966  Crast _____ 260—239.1

NICHOLAS S. RIZZO, Primary Examiner

U.S. Cl. X.R.

424—271

UNITED STATES PATENT OFFICE
CERTIFICATE OF CORRECTION

Patent No. 3,534,020    Dated October 13, 1970

Inventor(s) John Michael Essery and Donald Richard Van Harken

It is certified that error appears in the above-identified patent and that said Letters Patent are hereby corrected as shown below:

In claim 5, the formula should read as follows:

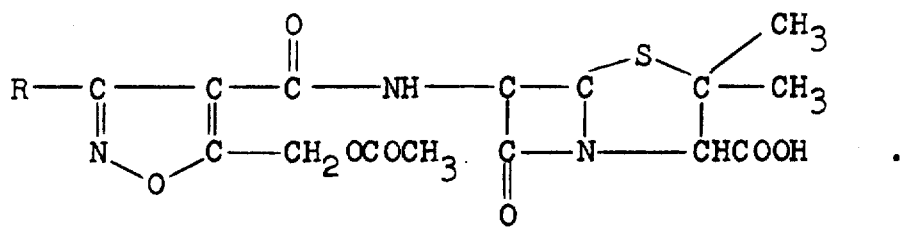

SIGNED AND
SEALED
DEC 29 1970

(SEAL)
Attest:

Edward M. Fletcher, Jr.
Attesting Officer

WILLIAM E. SCHUYLER, JR.
Commissioner of Patents